United States Patent [19]

Berner

[11] 4,344,876

[45] Aug. 17, 1982

[54] STABILIZATION OF ACID CATALYZED STOVING LACQUERS

[75] Inventor: Godwin Berner, Rheinfelden, Switzerland

[73] Assignee: Ciba-Geigy Corporation, Ardsley, N.Y.

[21] Appl. No.: 211,480

[22] Filed: Nov. 28, 1980

Related U.S. Application Data

[63] Continuation-in-part of Ser. No. 47,407, Jun. 11, 1979, abandoned.

[30] Foreign Application Priority Data

Jun. 21, 1978 [CH] Switzerland .......................... 6752/78

[51] Int. Cl.$^3$ ........................ C09D 3/28; C09D 3/81
[52] U.S. Cl. ..................................... 524/91; 106/176; 428/460; 525/162; 525/186; 525/443; 525/540; 524/99; 524/100; 524/102
[58] Field of Search .............. 260/15, 45.8 NP, 22 A; 427/388.3; 428/460; 525/162

[56] References Cited

U.S. PATENT DOCUMENTS 3,542,729  2/1970  Murayama et al. ............... 260/45.8
3,637,546  1/1972  Parker ..................... 260/15
3,640,928  2/1972  Murayama et al. ......... 260/45.8 NP
3,959,413  5/1976  Schwarzenbach et al. ... 260/45.8 R
4,086,204  4/1978  Cassandrini ................ 260/45.8
4,086,207  4/1978  Cassandrini et al. ....... 260/45.8 NP
4,110,304  8/1978  Gilg et al. .................. 260/45.8 NP
4,141,883  8/1979  Soma et al. ................. 260/45.8
4,147,674  4/1979  Vasta ............................. 260/22 CB
4,242,253  12/1980  Yallourakis ..................... 525/113
4,256,622  3/1981  Smith .............................. 525/162
4,278,589  7/1981  Dexter et al. .............. 260/45.8 NP
4,278,590  7/1981  Dexter et al. .............. 260/45.8 NP

FOREIGN PATENT DOCUMENTS 2753  7/1979  European Pat. Off. .
52-51427  2/1977  Japan .

*Primary Examiner*—John Kight, III
*Assistant Examiner*—R. A. White
*Attorney, Agent, or Firm*—Harry Falber

[57] ABSTRACT

Use of N-substituted 2,2,6,6-tetraalkylpiperidine compounds, their acid addition salts or complexes with metal compounds, optionally together with further stabilizers, for stabilizing acid catalyzed stoving lacquers based on hot cross-linkable acrylic or alkyd resins against the action of light, moisture and oxygen.

19 Claims, No Drawings

STABILIZATION OF ACID CATALYZED STOVING LACQUERS

This application is a continuation in part of copending application Ser. No. 047,407, filed June 11, 1979, now abandoned.

The present invention is concerned with the stabilising of acid catalysed stoving lacquers based on hot crosslinkable acrylic, polyester or alkyd resins against the action of light and moisture by the addition of N-substituted polyalkylpiperidine derivatives, and with the stabilised acid catalysed stoving varnishes thereby obtained.

On occasion, but especially in retouching finishes and lacquers with a high solids content for use in industrial finishes, stoving lacquer systems based on hot crosslinkable acrylic, polyester or alkyd resins are provided with an additional acid catalyst. In this case, failure symptoms caused by salt formation between light stabiliser and acid catalyst, delays in hardening, pigment flocculation, as well as a reduced light protective action, are observed. These problems can be solved in a satisfactory manner by means of the inventive use of N-substituted polyalkylpiperidine derivatives.

Accordingly, the present invention relates to the use of N-substituted 2,2,6,6-tetraalkylpiperidine compounds, their acid addition salts or complexes with metal compounds, optionally together with further stabilisers for stabilising acid catalysed stoving lacquers based on hot crosslinkable acrylic, polyester or alkyd resins, in particular acrylic or alkyd resins, against the action of light, moisture and oxygen.

The eligible N-substituted 2,2,6,6-tetraalkylpiperidine compounds of the invention are generally known and are already in use to prevent degradation by light. They are for example compounds which contain a group of the formula (I)

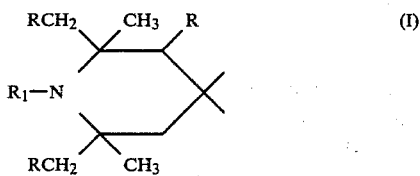

or polymers, the recurring structural units of which contain a group of the formula I or are linked through a bivalent group corresponding to the formula I, wherein $R_1$ represents a free valency, and otherwise R represents hydrogen or methyl and $R_1$ represents $C_1$–$C_{18}$ alkyl, $C_1$–$C_6$ hydroxyalkyl, $C_3$–$C_8$ alkenyl, $C_3$–$C_8$ alkynyl, $C_7$–$C_{12}$ aralkyl which is unsubstituted or substituted in the alkyl moiety by hydroxyl, or $C_1$–$C_8$ alkanoyl or $C_3$–$C_5$ alkenoyl.

Preferred N-substituted polyalkylpiperidine compounds are compounds or polymers which contain a group of the formula (I), wherein R is hydrogen and $R_1$ represents $C_1$–$C_8$ alkanoyl or $C_3$–$C_5$ alkenoyl.

The following classes of compounds belong to the light stabilisers of the present invention:
(a) light stabilisers of the formula (II)

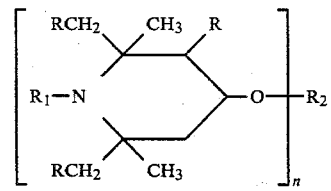

wherein n is 1 to 4, preferably 1 or 2, R has the meaning given for the formula (I), $R_1$ represents $C_1$–$C_{18}$ alkyl, $C_1$–$C_6$ hydroxyalkyl, $C_3$–$C_8$ alkenyl, $C_3$–$C_8$ alkynyl, $C_7$–$C_{12}$-aralkyl which is unsubstituted or substituted in the alkyl moiety by hydroxyl, or represents $C_1$–$C_8$ alkanoyl or $C_3$–$C_5$ alkenoyl, preferably $C_1$–$C_{12}$ alkyl, allyl, benzyl, acetyl, acryloyl, and $R_2$ if n is 1, represents hydrogen, $C_1$–$C_{12}$-alkyl, cyanoethyl, benzyl, glycidyl, a monovalent radical of a saturated or unsaturated aliphatic, cycloaliphatic, araliphatic or aromatic carboxylic acid, carbamic acid or phosphorus-containing acid or a monovalent silyl radical, preferably a radical of an aliphatic carboxylic acid containing 2 to 18 carbon atoms, of a cycloaliphatic carboxylic acid containing 5 to 12 carbon atoms or of an aromatic carboxylic acid containing 7 to 15 carbon atoms, and if n is 2, represents $C_1$–$C_{12}$ alkylene, $C_4$–$C_{12}$ alkenylene, xylylene, a divalent radical of a saturated or unsaturated aliphatic, cycloaliphatic, araliphatic or aromatic dicarboxylic acid, dicarbamic acid or phosphorus-containing acid or a divalent silyl radical, preferably a radical of an aliphatic dicarboxylic acid containing 2 to 12 carbon atoms, a cycloaliphatic or aromatic dicarboxylic acid containing 8 to 14 carbon atoms, or of an aliphatic, cycloaliphatic or aromatic dicarbamic acid containing 8 to 14 carbon atoms, and, if n is 3, represents a trivalent radical of an aliphatic, cycloaliphatic or aromatic tricarboxylic acid, of an aromatic tricarbamic acid or of a phosphorus-containing acid or a trivalent silyl radical, and if n is 4, represents a quadrivalent radical of an aliphatic, cycloaliphatic or aromatic tetracarboxylic acid.

$C_1$–$C_{12}$ alkyl is for example methyl, ethyl, n-propyl, n-butyl, sec-butyl, tert.-butyl, n-hexyl, n-octyl, 2-ethylhexyl, n-nonyl, n-decyl, n-undecyl or n-dodecyl.

$R_1$ as $C_1$–$C_{18}$ alkyl can be for example the groups recited above and in addition, for example, n-tridecyl, n-tetradecyl, n-hexadecyl or n-octadecyl.

$R_1$ as $C_1$–$C_6$ hydroxyalkyl is in particular $C_1$–$C_4$-hydroxyalkyl and preferably 2-hydroxyethyl and 2-hydroxy-n-butyl.

$R_1$ as $C_3$–$C_8$ alkenyl can be for example 1-propenyl, allyl, methallyl, 2-butenyl, 2-pentenyl, 2-hexenyl, 2-octenyl, 4-tert-butyl-2-butenyl.

$R_1$ as $C_3$–$C_8$ alkinyl is preferably propargyl.

$R_1$ as $C_7$–$C_{12}$ aralkyl is in particular phenethyl or, most preferably, benzyl, and, as aralkyl substituted in the alkyl moiety by hydroxyl, is in particular 2-hydroxyphenethyl.

$R_1$ as $C_1$–$C_8$ alkanoyl is for example formyl, propionyl, butyryl, octanoyl, but preferably acetyl, and, as $C_3$–$C_5$ alkenoyl, is in particular acryloyl.

$R_2$ as a monovalent radical of a carboxylic acid is for example a radical of acetic acid, stearic acid, salicylic acid, methacrylic acid, benzoic acid or β-(3,5-di-tert-butyl-4-hydroxyphenyl)-propionic acid.

R₂ as a divalent radical of a dicarboxylic acid is for example a radical of maleic acid, adipic acid, suberic acid, sebacic acid, phthalic acid, dibutylmalonic acid, dibenzylmalonic acid or butyl-(3,5-di-tert-butyl-4-hydroxybenzyl)-malonic acid.

R₂ as a trivalent radical of a tricarboxylic acid is for example a trimellitic acid radical.

R₂ as a quadrivalent radical of a tetracarboxylic acid is for example a pyromellitic acid radical.

R₂ as a divalent radical of a dicarbamic acid is for example a hexamethylenedicarbamic acid radical or a 2,4-toluylenedicarbamic acid radical.

The following compounds are examples of polyalkylpiperidine light stabilisers of this class:

1—4-hydroxy-1,2,2,6,6-pentamethylpiperidine
2—1-allyl-4-hydroxy-2,2,6,6-tetramethylpiperidine
3—1-benzyl-4-hydroxy-2,2,6,6-tetramethylpiperidine
4—1-(4-tert-butyl-2-butenyl)-4-hydroxy-2,2,6,6-tetramethylpiperidine
5—1-ethyl-4-salicyloyloxy-2,2,6,6-tetramethylpiperidine
6—4-methacryloyloxy-1,2,2,6,6-pentamethylpiperidine
7—1,2,2,6,6-pentamethylpiperidin-4-yl-β-(3,5-di-tert.-butyl-4-hydroxyphenyl)-propionate
8—1-benzyl-2,2,6,6-tetramethyl-4-piperidinylmaleinate
9—di-(1,2,3,6-tetramethyl-2,6-diethyl-piperidin-4-yl)sebacate
10—di-(1,2,2,6,6-pentamethylpiperidin-4-yl)sebacate
11—di-(1-allyl-2,2,6,6-tetramethyl-piperidin-4-yl)sebacate
12—di-(1-allyl-2,2,6,6-tetramethyl-piperidin-4-yl)phthalate
13—di-(1,2,2,6,6-pentamethylpiperidin-4-yl)-adipate
14—di-(1-allyl-2,2,6,6-tetramethylpiperidin-4-yl)adipate
15—1-propargyl-4-β-cyanoethyloxy-2,2,6,6-tetramethyl-piperidine
16—1-acetyl-2,2,6,6-tetramethylpiperidin-4-yl-acetate
17—1-acryloyl-4-benzyloxy-2,2,6,6-tetramethylpiperidine
18—dibutyl-di-(1,2,2,6,6-pentamethylpiperidin-4-yl)-malonate
19—butyl-(3,5-di-tert-butyl-4-hydroxybenzyl)-di-(1,2,2,6,6-pentamethylpiperidin-4-yl)-malonate
20—dibenzyl-di-(1,2,2,6,6-pentamethyl-piperidin-4-yl)-malonate
21—dibenzyl-di-(1,2,3,6-tetramethyl-2,6-diethyl-piperidin-4-yl)-malonate
22—hexan-1',6'-bis-(4-carbamoyloxy-1-n-butyl-2,2,6,6-tetramethylpiperidine)
23—toluene-2',4'-bis-(4-carbamoyloxy-1-n-propyl-2,2,6,6-tetramethylpiperidine)
24—tris-(1-propyl-2,2,6,6-tetramethylpiperidin-4-yl)-phosphite
25—tris-(1-propyl-2,2,6,6-tetramethylpiperidin-4-yl)-phosphate
26—phenyl-[bis-(1,2,2,6,6-pentamethylpiperidin-4-yl)]-phosphonate (b) Light stabilisers of the formula (III)

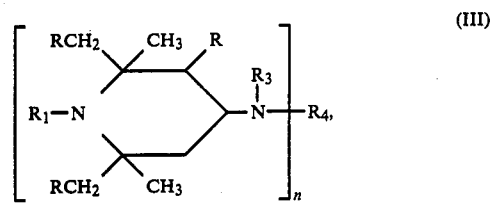

wherein n is 1 or 2, R has the meaning given for formula (I), R₁ has the meaning given in (a) above, R₃ represents $C_1$–$C_{12}$ alkyl, $C_5$–$C_7$ cycloalkyl, $C_7$–$C_8$ aralkyl, $C_2$–$C_{18}$ alkanoyl, $C_3$–$C_5$ alkenoyl, or benzoyl, and R₄ if n is 1, represents $C_1$–$C_{12}$ alkyl, $C_5$–$C_7$ cycloalkyl, $C_2$–$C_8$ alkenyl which is unsubstituted or substituted by a cyano, carbonyl or carbamide group, glycidyl, a group of the formula —CH₂—CH(OH)—Z or of the formula —CONH—Z, wherein Z is hydrogen, methyl or phenyl, and, if n is 2, represents $C_2$–$C_{12}$ alkylene, $C_6$–$C_{12}$ arylene, xylylene, a —CH₂CH(OH)—CH₂ group or a —CH₂—CH(OH)—CH₂—O—X—O—CH₂—CH(OH)—CH₂ group, wherein X represents $C_2$–$C_{10}$ alkylene, $C_6$–$C_{15}$ arylene, $C_6$–$C_{12}$ cycloalkylene, or, with the proviso that R₃ does not represent alkynoyl, alkenoyl or benzoyl, R₄ can also represent a divalent radical of an aliphatic, cycloaliphatic or aromatic dicarboxylic acid or dicarbamic acid, or R₃ and R₄ together, if n is 1, can be the cyclic radical of an aliphatic or aromatic 1,2- or 1,3-dicarboxylic acid.

Substituents represented by $C_1$–$C_{12}$ alkyl are those already defined in (a) above. $C_5$–$C_7$ cycloalkyl is in particular cyclohexane. R₃ as $C_7$–$C_8$ aralkyl is in particular phenethyl or, most preferably, benzyl. R₃ as $C_2$–$C_8$ alkanoyl is for example propionyl, butyryl, octanoyl, dodecanoyl, hexadecanoyl, octadecanoyl, but preferably acetyl, and, as $C_3$–$C_5$ alkenoyl, is in particular acryloyl.

R₄ as $C_2$–$C_8$ alkenyl which is unsubstituted or substituted by a cyano, carbonyl or carbamide group is for example 1-propenyl, allyl, methallyl, 2-butenyl, 2-pentenyl, 2-hexenyl, 2-octenyl, 2,2-dicyanovinyl, 1-methyl-2-cyano-2-methoxycarbonylvinyl, 2,2-diacetylaminovinyl.

$C_2$–$C_{12}$ alkylene is for example ethylene, propylene, 2,2-dimethylpropylene, tetramethylene, hexamethylene, octamethylene, decamethylene or dodecamethylene.

$C_6$–$C_{15}$ arylene is for example o-, m- or p-phenylene 1,4-naphthylene or 4,4'-diphenylene.

X as $C_6$–$C_{12}$ cycloalkylene is in particular cyclohexylene.

The following compounds are examples of polyalkylpiperidine light stabilisers of this class:

27—N,N'-bis-(1,2,2,6,6-pentamethylpiperidin-4-yl)hexamethylene-1,6-diacetamide
28—1-acetyl-4-(N-cyclohexylacetamido)-2,2,6,6-tetramethylpiperidine
29—The compound of the formula

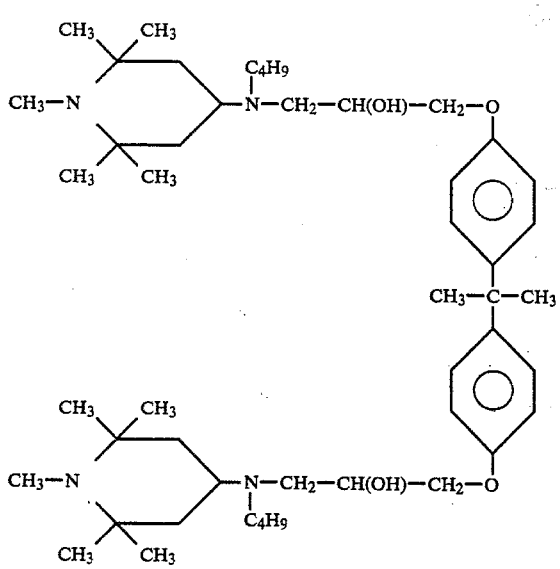

30—4-(di-2-hydroxyethyl)-amino-1,2,2,6,6-pentamethylpiperidine
31—4-(di-2-hydroxyethyl)-amino-1-(2-hydroxyethyl)-2,2,6,6-tetramethylpiperidine
32—4-methacrylamido-1,2,2,6,6-pentamethylpiperidine (c) Light stabilisers of the formula (IV)

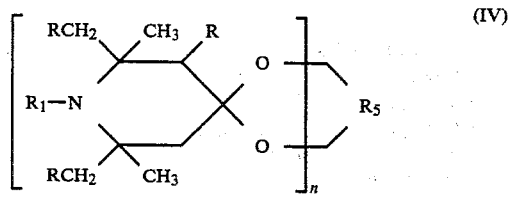

wherein n is 1 or 2, R has the meaning given for formula (I) $R_1$ has the meaning given in (a), and $R_5$ if n is 1, represents $C_2$–$C_8$ alkylene or hydroxyalkylene or $C_4$–$C_{22}$ acyloxyalkylene, and if n is 2, represents the group $(-CH_2)_2C(CH_2-)_2$.

$R_5$ as $C_2$–$C_8$ alkylene or hydroxyalkylene is for example ethylene, 1-methylethylene, propylene, 2-ethylpropylene, 2-ethyl-2-hydroxymethylpropylene.

$R_5$ as $C_4$–$C_{22}$ acyloxyalkylene is for example 2-ethyl-2-acetoxymethylpropylene.

The following compounds are examples of polyalkylpiperidine light stabilisers of this class:
33—8-aza-2,7,7,8,9,9-hexamethyl-1,4-dioxyspiro[4.5]decane
34—9-aza-3-hydroxymethyl-3-ethyl-8,8,9,10,10-pentamethyl-1,5-dioxaspiro[5.5]undecane
35—9-aza-3-ethyl-3-acetoxymethyl-9-acetyl-8,8,10,10-tetramethyl-1,5-dioxaspiro[5.5]undecane (d) Light stabilisers of the formula (V)

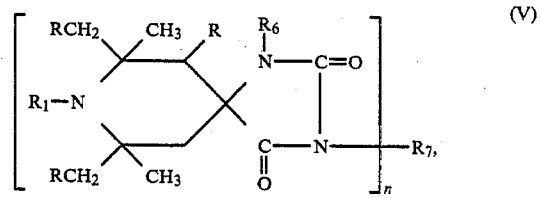

wherein n is 1 or 2, R has the meaning given for formula (I), $R_1$ has the meaning given in (a), $R_6$ represents hydrogen, $C_1$–$C_{12}$ alkyl, allyl, benzyl, glycidyl, $C_2$–$C_6$ alkoxyalkyl, and $R_7$ if n is 1, represents hydrogen, $C_1$–$C_{12}$ alkyl, glycidyl, $C_3$–$C_5$ alkenyl, $C_7$–$C_9$ aralkyl, $C_5$–$C_7$ cycloalkyl, $C_2$–$C_4$ hydroxyalkyl, $C_2$–$C_6$ alkoxyalkyl, $C_6$–$C_{10}$ aryl, and if n is 2, represents $C_2$–$C_{12}$ alkylene, $C_6$–$C_{12}$ arylene or a group $-CH_2CH(OZ)CH_2-(OCH_2-CH(OZ)CH_2)_2-$, wherein Z represents hydrogen, $C_1$–$C_{18}$ alkyl, allyl, benzyl, $C_2$–$C_{12}$ alkanoyl or benzoyl.

$C_1$–$C_{12}$ alkyl is for example methyl, ethyl, n-propyl, n-butyl, sec-butyl, tert-butyl, n-hexyl, n-octyl, 2-ethylhexyl, n-nonyl, n-decyl, n-undecyl or n-dodecyl.

Z as $C_1$–$C_{18}$ alkyl can be for example the groups cited above and, in addition, for example n-tridecyl, n-tetradecyl, n-hexadecyl or n-octadecyl.

Substituents represented by $C_2$–$C_6$ alkoxyalkyl are for example methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

$R_7$ as $C_3$–$C_5$ alkenyl is for example 1-propenyl, allyl, methallyl, 2-butenyl or 2-pentenyl.

$R_7$ as $C_7$–$C_9$ aralkyl is in particular phenethyl or, most preferably, benzyl, and, as $C_5$–$C_7$ cycloalkyl is in particular cyclohexyl.

$R_7$ as $C_2$–$C_4$ hydroxyalkyl is for example 2-hydroxyethyl, 3-hydroxypropyl or 4-hydroxybutyl.

$R_7$ as $C_6$–$C_{10}$ aryl is in particular phenyl, α- or β-naphthyl, which are unsubstituted or substituted by halogen or $C_1$–$C_4$ alkyl.

$R_7$ as $C_2$–$C_{12}$ alkylene is for example ethylene, propylene, 2,2-dimethylpropylene, tetramethylene, hexamethylene, octamethylene, decamethylene or dodecamethylene.

$R_7$ as $C_6$–$C_{12}$ arylene is for example o-m- or p-phenylene, 1,4-naphthylene or 4,4'-diphenylene.

Z as $C_2$–$C_{12}$ alkanoyl is for example propionyl, butyryl, octanoyl, dodecanoyl or preferably acetyl.

The following compounds are examples of polyalkylpiperidine light stabilisers of this class:
36—3-benzyl-1,3,8-triaza-7,7,8,9,9-pentamethylspiro[4.5]decane-2,4-dione
37—3-n-octyl-1,3,8-triaza-7,7,8,9,9-pentamethylspiro[4.5]decane-2,4-dione
38—3-allyl-1,3,8-triaza-1,7,7,8,9,9-hexamethylspiro[4.5]decane-2,4-dione
or the compounds of the following formulae:

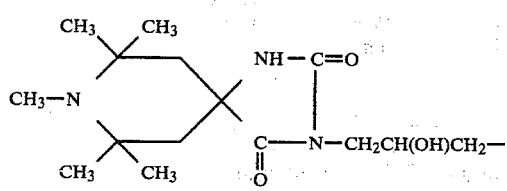

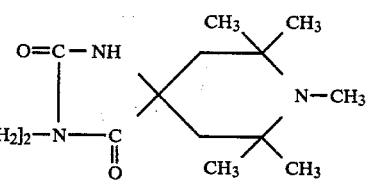

39

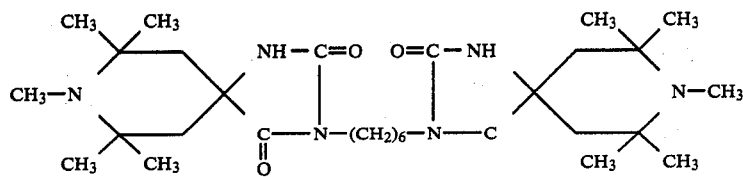

40

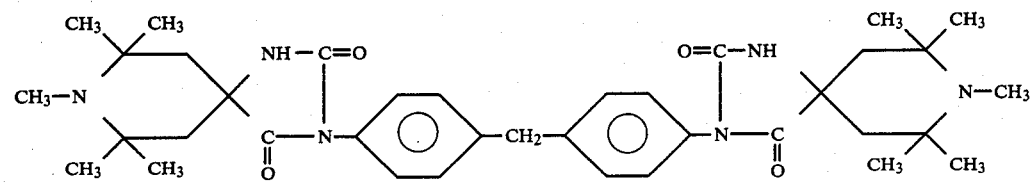

41

(e) Light stabilisers of the formula (VI)

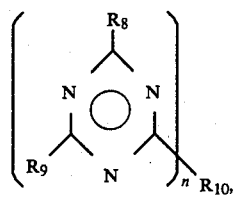

(VI)

wherein n is 1 or 2, $R_8$ represents a group of the formula

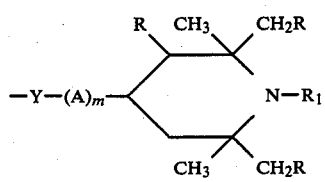

wherein R has the meaning given for formula (I), $R_1$ has the meaning given in (a), Y is —O— or —$NR_{11}$, A represents $C_2$–$C_6$alkylene and m is 0 or 1, $R_9$ represents the groups $R_8$, $NR_{11}R_{12}$, —$OR_{13}$, —NHCH$_2$OR$_{13}$ or —N(CH$_2$OR$_{13}$)$_2$, $R_{10}$ if n is 1, represents the groups $R_8$ or $R_9$ and, if n is 2, represents the group —Y—Q—Y—, wherein Q represents $C_2$–$C_6$alkylene which is optionally interrupted by —N($R_{14}$)—, $R_{11}$ represents $C_1$–$C_{12}$alkyl, cyclohexyl, benzyl or $C_1$–$C_4$-hydroxyalkyl or a group of the formula

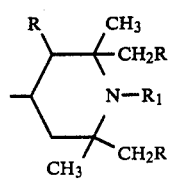

$R_{12}$ represents $C_1$–$C_{12}$alkyl, cyclohexyl, benzyl, $C_1$–$C_4$hydroxyalkyl, $R_{13}$ represents hydrogen, $C_1$–$C_{12}$alkyl or phenyl, and $R_{14}$ represents hydrogen or the group —CH$_2$OR$_{13}$, or $R_{11}$ and $R_{12}$ together are $C_4$–$C_5$alkylene or oxaalkylene, or each of $R_{11}$ and $R_{12}$ represents a group of the formula

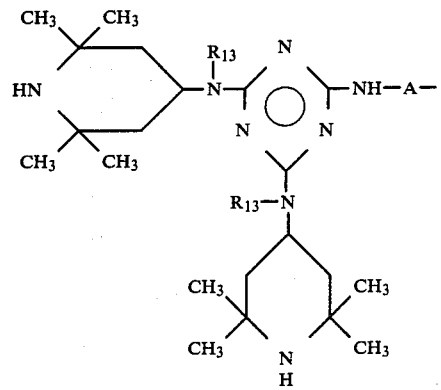

Substituents represented by $C_1$–$C_{12}$alkyl are for example methyl, ethyl, n-propyl, n-butyl, sec-butyl, tert-butyl, n-hexyl, n-octyl, 2-ethylhexyl, n-nonyl, n-decyl, n-undecyl or n-dodecyl.

Substituents represented by $C_1$–$C_4$hydroxyalkyl are for example ethylene, propylene, 2,2-dimethylpropylene, tetramethylene or hexamethylene.

$R_{11}$ and $R_{12}$ together as $C_4$–$C_5$alkylene or oxaalkylene are for example tetramethylene, pentamethylene or 3-oxa-pentamethylene.

Compounds of the following formulae are examples of polyalkylpiperidine light stabilisers of this class:

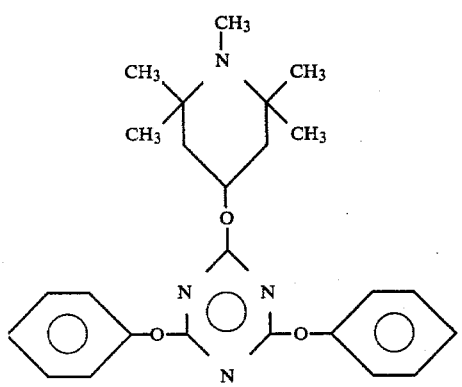

(42)

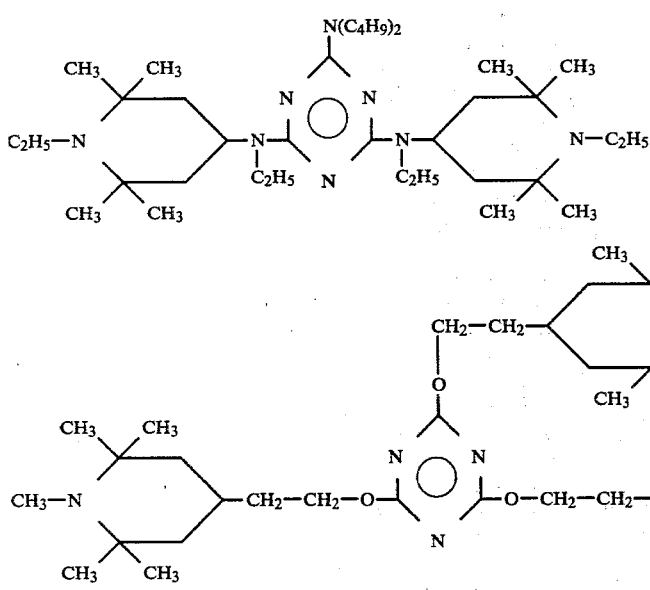

(43)

(44)

(f) Light stabilisers of the formula (VII)

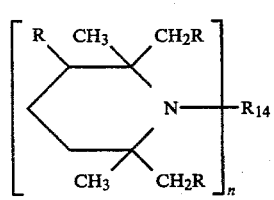
(VII)

wherein n is 1 or 2, R represents hydrogen or methyl, and $R_{14}$ if n is 1, represents $C_4$–$C_{18}$alkyl, $C_7$–$C_{12}$aralkyl, the group —CO—$R_{15}$, $C_1$–$C_4$alkyl substituted by —CN, —COOR$_{16}$, —OH, —OCOR$_{17}$ or

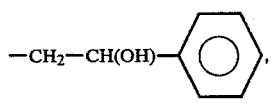

wherein $R_{15}$ represents $C_1$–$C_{12}$alkyl, $C_2$–$C_4$alkenyl or phenyl, $R_{16}$ represents $C_1$–$C_{18}$alkyl, $R_{17}$ represents $C_1$–$C_{18}$alkyl, $C_2$–$C_{10}$alkenyl, cyclohexyl, benzyl or $C_6$–$C_{10}$aryl or $R_{14}$, if n is 2, represents $C_4$–$C_{12}$alkylene, 2-butenylene-1,4, xylylene, the groups —(CH$_2$-)$_2$—OOC—$R_{18}$—COO—(CH$_2$)$_2$—, —CH$_2$—OOC—$R_{19}$—COO—CH$_2$— or —CH$_2$—CH(OH)—CH$_2$—O—$R_{18}$—O—CH$_2$—CH(OH)—CH$_2$—, wherein $R_{18}$ represents $C_2$–$C_{10}$alkylene, phenylene, cyclohexylene or 2,2-diphenylenepropane, and $R_{19}$ represents $C_2$–$C_{10}$alkylene, xylylene or cyclohexylene.

Substituents represented by $C_1$–$C_{12}$alkyl are for example methyl, ethyl, n-propyl, n-butyl, sec-butyl, tert.butyl, n-hexyl, n-octyl, 2-ethylhexyl, n-nonyl, n-decyl, n-undecyl or n-dodecyl.

Substituents represented by $C_1$–$C_{18}$alkyl can be for example the groups cited above and, in addition, for example n-tridecyl, n-tetradecyl, n-hexadecyl or n-octadecyl.

Groups represented by $C_2$–$C_{10}$alkylene are for example ethylene, propylene, 2,2-dimethylpropylene, tetramethylene, hexamethylene, octamethylene or decamethylene.

$R_{14}$ as $C_4$–$C_{18}$alkyl is for example n-butyl, sec-butyl, tert-butyl, n-hexyl, n-octyl, 2-ethylhexyl, 1,1-dimethyl-2-tert-butylethyl, n-nonyl, n-decyl, n-dodecyl, n-tridecyl, n-hexadecyl or n-octadecyl.

$R_{14}$ as $C_1$–$C_4$alkyl substituted by —CN is for example cyanomethyl, cyanoethyl, 3-cyano-n-propyl, 4-cyano-n-butyl.

$R_{14}$ as $C_4$–$C_{12}$alkylene is for example 2,2-dimethylpropylene, tetramethylene, hexamethylene, octamethylene, decamethylene or dodecamethylene.

$R_{14}$ as $C_7$-$C_{12}$aralkyl is in particular phenethyl, p-methylbenzyl, or most preferable, benzyl.

$R_{15}$ as $C_2$-$C_4$alkenyl is for example vinyl, 1-propenyl, allyl, methallyl, 2-butenyl.

$R_{17}$ as $C_2$-$C_{10}$alkenyl represents for example the groups cited in the definition of $R_{15}$ as alkenyl and, in addition, for example crotyl, 2-hexenyl, 2-octenyl or 2-decenyl.

$R_{17}$ as $C_6$-$C_{10}$aryl is for example phenyl which is unsubstituted or substituted in the ortho- or para-position by methyl, ethyl, isopropyl, n-butyl or tert-butyl.

The following compounds are examples of polyalkylpiperidine light stabilisers of this class:

45—bis-[2-(2,2,6,6-tetramethylpiperidino)-ethyl]sebacate

46—1-octoxycarbonylmethyl-2,2,6,6-tetramethylpiperidine

47—1,4-bis-(2,2,6,6-tetramethylpiperidino)-2-butene.

(g) Light stabilisers of the formula (VIII)

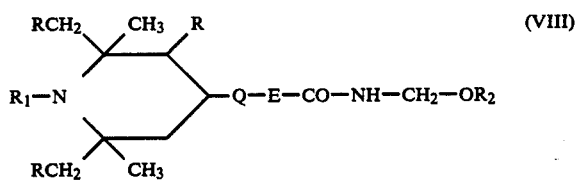

(VIII)

wherein Q is —N($R_3$)— or —O—, E is $C_1$-$C_3$alkylene, the —$CH_2$—CH($R_4$)—O— group, wherein $R_4$ is hydrogen, methyl or phenyl, the —($CH_2$)$_3$—NH— group or a single bond, R is hydrogen or methyl, $R_1$ is $C_1$-$C_{18}$alkyl, $C_3$-$C_8$alkenyl, $C_3$-$C_8$alkynyl, $C_7$-$C_{12}$aralkyl, $C_1$-$C_8$alkanoyl, $C_3$-$C_5$alkenoyl, glycidyl, $R_2$ is hydrogen or $C_1$-$C_{18}$alkyl, $R_3$ is hydrogen, $C_1$-$C_{18}$alkyl, $C_5$-$C_7$cycloalkyl, $C_7$-$C_{12}$aralkyl, cyanoethyl, $C_6$-$C_{10}$aryl, the —$CH_2$—CH($R_4$)—OH group, wherein $R_4$ is as defined above, a group of the formula

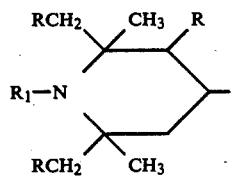

or a group of the formula

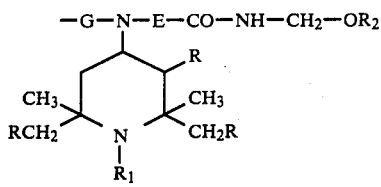

wherein G can be $C_2$-$C_6$alkylene or $C_6$-$C_{12}$arylene, or $R_3$ is a E—CO—NH—$CH_2$—$OR_2$ group.

$C_1$-$C_{18}$Alkyl is, for example, methyl, ethyl, n-propyl, n-butyl, sec-butyl, tert-butyl, n-hexyl, n-octyl, 2-ethylhexyl, n-nonyl, n-decyl, n-undecyl, n-dodecyl, n-tridecyl, n-tetradecyl, n-hexadecyl, or n-octadecyl.

$C_7$-$C_{12}$Aralkyl is, for example, phenylethyl or, in particular, benzyl.

$R_1$ as $C_3$-$C_8$alkenyl can be, for example, 1-propenyl, allyl, methallyl, 2-butenyl, 2-pentenyl, 2-hexenyl, 2-octenyl or 4-tert-butyl-2-butenyl.

$R_1$ as $C_3$-$C_8$alkynyl is preferably propargyl, and, as $C_1$-$C_8$-alkanoyl, is e.g. formyl, propionyl, butyryl, octanoyl, but preferably acetyl, and, as $C_3$-$C_5$alkenoyl, is in particular acryloyl.

$R_3$ as $C_5$-$C_7$cycloalkyl is in particular cyclohexyl, and, as $C_6$-$C_{10}$aryl, is in particular phenyl or $\alpha$- or $\beta$-naphthyl, which can be substituted by halogen or $C_1$-$C_4$alkyl. E as $C_1$-$C_3$ alkylene is for example methylene, ethylene or propylene.

G as $C_2$-$C_6$alkylene is e.g. ethylene, propylene, 2,2-dimethylpropylene, tetramethylene or hexamethylene, and, as $C_6$-$C_{12}$arylene, is iso-, m- or p-phenylene, 1,4-naphthylene or 4,4'-diphenylene.

The following compounds are examples of polyalkylpiperidine light stabilisers of this class:

48—N-hydroxymethyl-N'-2,2,6,6-tetramethylpiperidine-4-yl urea

49—N-methoxymethyl-N'-2,2,6,6-tetramethylpiperidin-4-yl urea

50—N-methoxymethyl-N'-n-dodecyl-N'-2,2,6,6-tetramethylpiperidin-4-yl urea

51—O-(2,2,6,6-tetramethylpiperidin-4-yl)-N-methoxymethyl urea.

(h) Polymeric compounds, the recurring structural units of which contain a group of the formula I or which are linked through a bivalent group corresponding to the formula I, wherein $R_1$ represents a free valency, and otherwise R and $R_1$ have the meanings given above, especially polyesters, polyethers, polyamides, polyamines, polyurethanes, polyureas, polyaminotriazines, poly(meth)acrylates, poly(meth)acrylamides and the copolymers thereof which contain such radicals.

Examples of polyalkylpiperidine light stabilisers of this class are the compounds of the following formulae, wherein m is 2 to about 200:

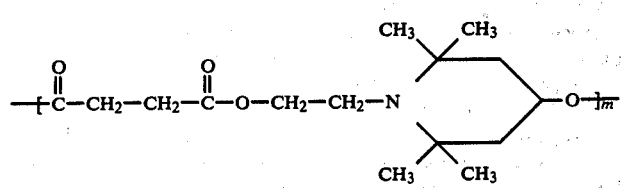

52

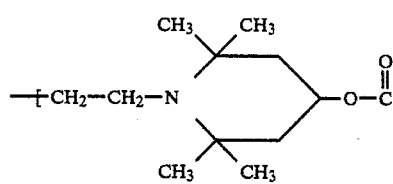 53
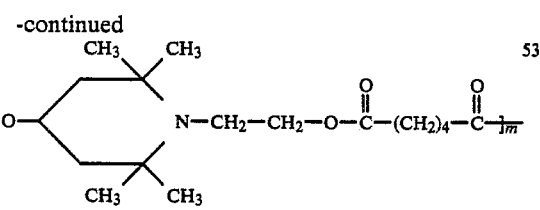
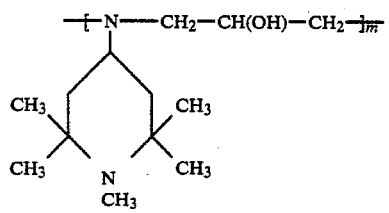 54
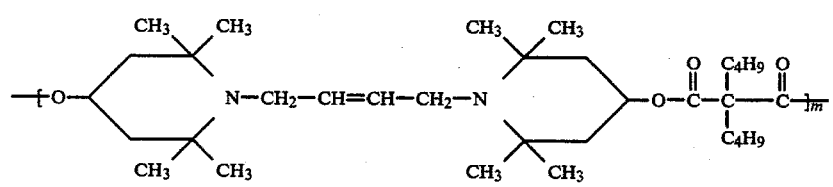 55
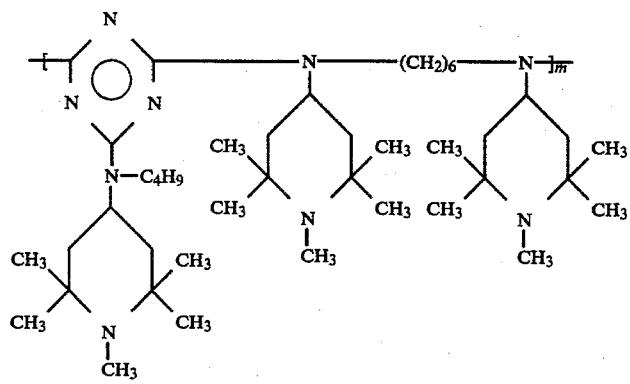 56
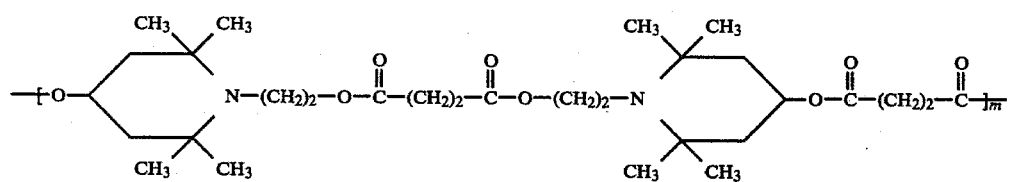 57
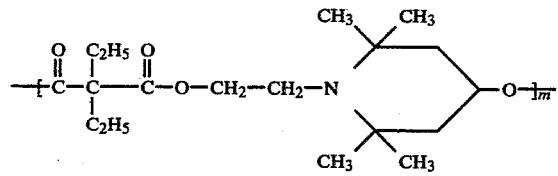 58
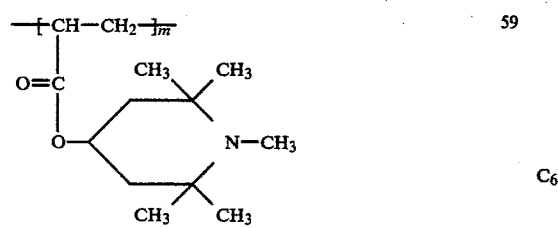 59
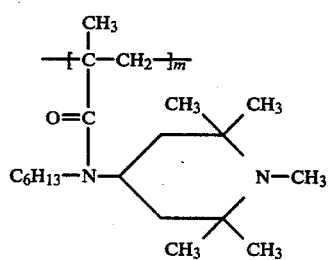 60
(i) Compounds which contain in their molecule at least one 2-(2'-hydroxyphenyl)-benztriazole group or 2-hydroxybenzophenone group and at least one polyalkylpiperidine group.

Examples of polyalkylpiperidine light stabilisers of this class are the compounds of the following formulae:

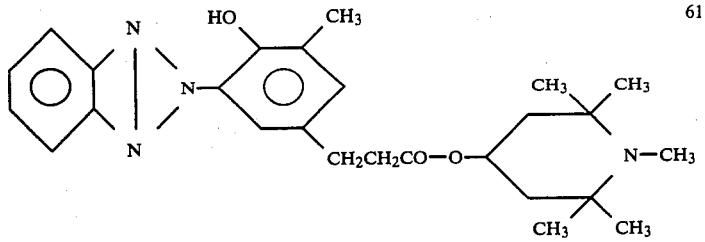
61

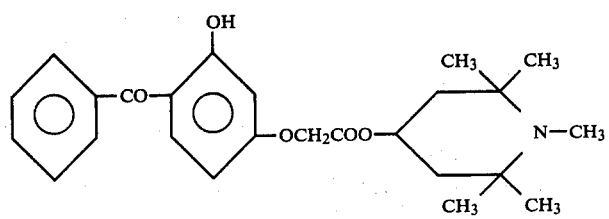
62

It is also possible to use polyalkylpiperidine derivatives of classes (a) to (i) which form chemical bonds with the binder of the lacquer. This occurs when the polyalkylpiperidine derivative contains a reactive group suitable for the purpose, for example a glycidyl group or a methylol group.

Examples of such compounds are the polyalkylpiperidine derivatives of class (g) which contain methylol or methylol ether groups.

If the polyalkylpiperidine compounds are basic compounds, they can form salts with acids. Suitable acids for the salt formation are for example inorganic acids or organic carboxylic, sulfonic, phosphonic or phosphinic acids, for example hydrochloric acid, boric acid, phosphoric acid, acetic acid, salicyclic acid, toluenesulfonic acid or benzenephpsphonic acid.

The polyalkylpiperidine compounds can form complexes with complex forming metal compounds, for example with zinc (II) acetate, cobalt(II) acetylacetonate, nickel(II) acetylacetonate, aluminium(III) acetylacetonate, nickel(II)benzoate or aluminium(III) benzoylacetonate.

The acrylic resin lacquers, which can be stabilised against light, moisture and oxygen in accordance with the invention, are the conventional acrylic resin stoving lacquers which are described, for example, in H. Kittel's "Lehrbuch der Lacke und Beschichtungen", Vol. 1, Part 2, on pages 735 and 742 (Berlin 1972), and in "Lackkunstharze" (1977), by H. Wagner and H. F. Sarx, on pages 229–238.

The polyester lacquers, which can be stabilised against the action of light and moisture, are the conventional stoving lacquers described e.g. in H. Wagner and H. F. Sarx, op. cit., on pages 86–99.

The alkyd resin lacquers which can be stabilised against the action of light and moisture in accordance with the invention, are the conventional stoving lacquers which are used in particular for coating automobiles (automobile finishing lacquers), for example lacquers based on alkyd/melamine resins and alkyd/acrylic/melamine resins (see H. Wagner and H. F. Sarx, op. cit., pages 99–123).

The acid catalysed stoving lacquers stabilised in accordance with the invention are suitable both for metal finish coatings and solid shade finishes, especially in the case of retouching finishes. The lacquers stabilised in accordance with the invention are preferably applied in the conventional manner by two methods, either by the single-coat method or by the two-coat method. In the latter method, the pigment-containing coat is applied first and then a covering coat of clear lacquer over it.

The amount of polyalkylpiperidine derivative employed is 0.01 to 5% by weight, based on the solvent-free binder, preferably 0.5 to 1% by weight. The lacquers can be dissolved or dispersed in customary organic solvents or in water or can be solvent-free.

When used in two-coat finishes, the polyalkylpiperidine derivative eligible for use in the inventive stabilising can be incorporated either only in the unpigmented finishing lacquer or both in the unpigmented finishing lacquer and in the pigmented priming lacquer. In the manufacture of acrylic modified alkyd resins or acrylic resins, polymerisable polyalkylpiperidine derivatives (for example compounds 6 and 28) can be polymerised into the resin. The incorporation into the lacquer binder can also, however, be effected via polycondensation in the manufacture or, as the case may be, in the stoving, of the melamine, alkyd or polyester resins.

Examples of polyalkylpiperidine derivatives which can be incorporated by condensation are compounds 1, 30 and 31, and also 1-hydroxyethyl-4-hydroxy-2,2,6,6-tetramethylpiperidine. The incorporation via polyaddition can be accomplished for example via the reaction of free glycidyl groups in the polyalkylpiperidine derivative with acid groups of the acrylic resin. These glycidyl groups can be incorporated by polymerising (meth-)acrylic acid into the resin.

In these cases, there is the additional advantage that the light stabilisers cannot be removed by extraction or migration, so that their action is very prolonged.

To attain maximum light stability, the concurrent use of other conventional light stabilisers can be advantageous. Examples are UV absorbers of the benzophenone, benztriazole, acrylic acid derivative, or oxalanilide type, or metal-containing light stabilisers, for example organic nickel compounds.

If such combinations are employed, the sum of all light stabilisers is 0.2 to 5% by weight, preferably 0.5 to 2% by weight, based on the film-forming resin.

Further ingredients which the lacquers can contain are antioxidants, for example those of the sterically hindered phenol derivative type, phosphorus compounds, such as phosphites, phosphines or phosphonites, plasticisers, levelling assistants, hardening catalysts, thickeners, dispersants or adhesion promoters.

The following Examples describe the inventive use of N-substituted polyalkylpiperidine derivatives in acid catalysed stoving lacquers based on acrylic resin containing binder systems. Parts and percentages are by weight.

EXAMPLE 1

Stabilising action of different polyalkylpiperidine derivatives in a hot crosslinkable acrylic resin lacquer catalysed with maleic acid (two-coat metallic effect finish)

Basic composition of the lacquers (a) Metallic effect priming lacquer 27 parts of polyester resin L 1850 (Dynamit Nobel AG)
3 parts of melamine resin Maprenal RT (Farbwerke Hoechst AG)
2 parts of cellulose acetobutyrate CAB 531 (Eastman Chem. Corp.)
8 parts of aluminium bronze ALCOA 726 (aluminium Corp. of America)
10 parts of toluene
7 parts of xylene
3 parts of butanol
25 parts of butyl acetate
15 parts of aromatic solvent Solvesso 150 (Esso AG).

(b) Unpigmented finishing lacquer 56 parts of acrylic resin Paraloid OL 42 (Rohm & Haas Corp.)
20 parts of melamine resin Cymel 301 (American Cyanimide Corp.)
3.5 parts of maleic acid (20% in dioxan)
2 parts of cellulose acetobutyrate CAB 551 (Eastman Chem. Corp.)
11 parts of butanol
4.5 parts of butyl acetate.

Pieces of aluminium sheeting measuring 57×79 mm×0.5 mm, which were coated with a primer based on polyester/epoxide resin, were first coated with the priming lacquer and subsequently with the finishing lacquer. The priming lacquer was sprayed on to a thickness of about 15μ and aired for about 10 minutes. Then the clear lacquer was sprayed on to a thickness of about 30μ. After being aired for 15 minutes the samples were stoved for 30 minutes at 150° C.

Before application, 1% (based on the film-forming resin) of the polyalkylpiperidine compound listed in column 1 of Table 1 was added to the priming lacquer in each case (numbered according to the Examples referred to the description). For comparison, the following N-unsubstituted polyalkylpiperidine compounds designated by Roman numerals were also employed:

Compound I: 4-hydroxy-2,2,6,6-tetramethylpiperidine (N-unsubstituted homologue of compounds 1, 2, 3 and 4).

Compound II: di-(2,2,6,6-tetramethylpiperidine-4-yl)-sebacate.

Compound III:

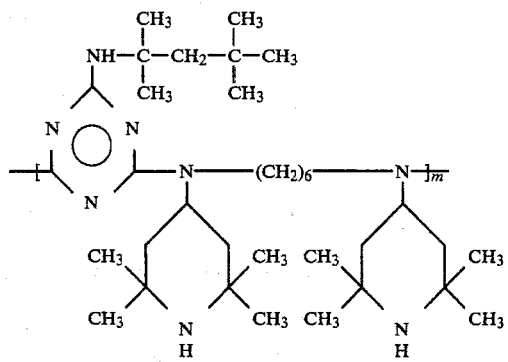

After storage for 4 weeks in an air-conditioned room (23° C./50% relative humidity), the coated sheets were subjected to weathering for 900 hours according to test method ASTM G-53/77 in a QUV tester. In this test, the samples were subjected to weathering for 4 hours in a humid atmosphere and UV light at 50° C. and for 4 hours under UV light at 60° C. Subsequently the weight loss of the finishes was determined gravimetrically (indicated in $g/m^2$ in column 2 of Table 1), and the gloss of the surface of the finish was measured in accordance with ASTM D 523 (the values are reported in column 3).

TABLE 1

| Stabiliser | Weight loss | 20° gloss (averaged) |
|---|---|---|
| without additive | 21.8 | 5 |
| compound I | 6.5 | 14 |
| compound II | 16.4 | 4 |
| compound III | 19.9 | 3 |
| compound 1 | 6.6 | 66 |
| compound 2 | 6.9 | 67 |
| compound 3 | 6.8 | 72 |
| compound 4 | 6.8 | 48 |
| compound 20 | 5.7 | 55 |
| compound 31 | 9.0 | 36 |
| compound 58 | 8.9 | 37 |

EXAMPLE 2

Precipitations in an acid-catalysed, hot crosslinkable acrylic resin lacquer

Each of the light stabilisers listed in column 1 of Table 2 (1% based on the coating) was dissolved in the priming lacquer described in Example 1, initially without addition of catalyst. Then maleic acid was added as catalyst in the same amount as indicated in Example 1, and precipitation effects were observed, depending on the type of stabiliser employed. The results are reported in Table 2.

TABLE 2

| Stabiliser | Appearance of the lacquer | |
|---|---|---|
| | without addition of acid | with addition of acid |
| without addition | clear | clear |
| compound I | clear | precipitate |
| compound II | clear | precipitate |
| compound III | clear | precipitate |
| compound 1 | clear | clear |
| compound 2 | clear | clear |
| compound 3 | clear | clear |
| compound 4 | clear | clear |
| compound 19 | clear | clear |
| compound 20 | clear | clear |
| compound 31 | clear | clear |
| compound 45 | clear | clear |

TABLE 2-continued

| Stabiliser | Appearance of the lacquer | |
|---|---|---|
| | without addition of acid | with addition of acid |
| compound 58 | clear | clear |

EXAMPLE 3

Delays in curing by addition of light stabilisers to acid-catalysed hot crosslinkable acrylic resin lacquers To the priming lacquer described in Example 1 was added 0.34% of maleic acid (MA) and 0.071% of p-toluenesulfonic acid (pTS) as catalysts (percentage amounts, based in each case on the film-forming resin). After addition of 1% of the stabilisers listed in column 1 of Table 3, the lacquers were applied wet to glass plates in layers of about 50μ. The lacquers were then stoved for 30 minutes at 150° C. and, after storage for 1 day in an air-conditioned room (23° C./50% relative humidity), the hardness was evaluated by means of the oscillation test using the pendulum apparatus according to König (DIN 53 157). The results are reported in Table 3.

TABLE 3

| Stabiliser | 0.34% MA | 0.071% pTS |
|---|---|---|
| without addition | 148 | 164 |
| compound II | 76 | tacky |
| compound III | 113 | tacky |
| compound 2 | 142 | 166 |
| compound 3 | 140 | 162 |
| compound 4 | 145 | 158 |
| compound 19 | 138 | 83 |
| compound 20 | 152 | 57 |
| compound 45 | 131 | 142 |
| compound 58 | 145 | 162 |

EXAMPLE 4

Influence of polyalkylpiperidine derivatives on spraying in an acid-catalysed stoving lacquer (single-coat metallic effect finish)

Basic composition of the lacquer 57.6 parts of acrylic resin lacquer Synthracryl SC 300 (Farbwerke Hoechst), 50% in xylene/butanol 2:1
24.5 parts of melamine resin Maprenal MF 650 (Farbwerke Hoechst), 55% in isobutanol
1.3 parts of aluminium paste Stapa Mobile R (Eckast-Werke, Fürth, Germany)
3.4 parts of maleic acid (20% in dioxane)
3.9 parts butyl glycol acetate
2 parts of ethyl glycol acetate
7.3 parts of xylene.

The metallic effect lacquer was adjusted with xylene to a spray viscosity of about 19 sec (DIN 53211) and sprayed onto aluminium sheets coated with a coil coat. After brief airing, the finishes were stoved for 30 minutes at 80° C. and evaluated. The results are reported in Table 4 (compounds I, II and III: cf. Example 1. The light stabilisers of the invention are numbered according to the Examples referred to in the description).

TABLE 4

| Light stabiliser* (1%, based on lacquer solids) | Appearance of the finishes after stoving |
|---|---|
| without additive | faultless |
| compound I | pitting, spreading faults |
| compound II | dull, pitting |
| compound III | dull, pitting |
| compound 1 | faultless |
| compound 2 | faultless |
| compound 3 | faultless |
| compound 19 | faultless |

*dissolved in xylene and then added to the lacquer

EXAMPLE 5

Delays in low-temperature curing by addition of piperidine light stabilisers

Aluminium sheets of 0.5 mm thickness, coated with a white primer based on a polyester resin, were coated with a high-solid clear lacquer of the following recipe:
53.7 parts acrylic resin (Paraloid OL 42, Rohm & Haas Corp.)
19.3 parts melamine resin (Cymel 301, Amer. Cyanamid Corp.)
3.0 parts cellulose acetobutyrate (CAB 551, Eastman Chem. Corp.)
10.5 parts n-butanol
10.5 parts butyl acetate
3.0 parts flow control agent (Byketol special, Byk-Mallinckrodt)
0.12 parts p-toluenesulfonic acid This lacquer has a content of 62.16% solids. The following light stabilisers are added to this lacquer in the amounts given in table 5:

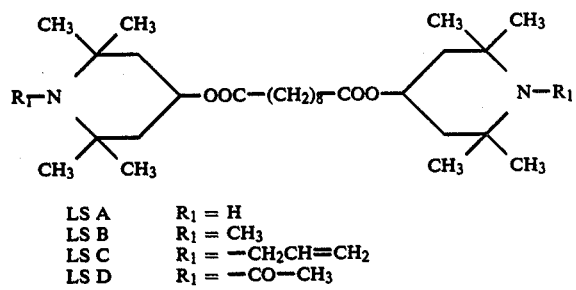

| | |
|---|---|
| LS A | $R_1 = H$ |
| LS B | $R_1 = CH_3$ |
| LS C | $R_1 = -CH_2CH=CH_2$ |
| LS D | $R_1 = -CO-CH_3$ |

The lacquer was applied by spraying in such a thickness that after drying a coating of 30 μm resulted. After air-drying the samples were stoved for 30 minutes at 150° C.

After storage for 30 minutes in an air-conditioned room (23° C./50% rel. humidity) the hardness of the coating films was evaluated by the pendulum method of Koenig (DIN 53 157). The resulting "pendulum hardness" is listed in table 5.

TABLE 5

| Light Stabiliser | Pendulum Hardness (sec) |
|---|---|
| without | 60 |
| 0.5% LS A | tacky |
| 0.5% LS B | 20 |
| 0.5% LS C | 24 |
| 0.5% LS D | 60 |

It is to see from the table that the N-unsubstituted piperidine light-stabiliser (A) effects a heavy delay in curing. If $R_1$ is methyl (B) or allyl (C) the delay becomes markedly smaller. In the case that $R_1$ is acetyl (D) no delay at all is to see. Such more detailed differences between the N-substituted piperidine derivatives of the invention becomes evident in the case of lower curing temperatures and of lower catalyst concentration. Therefore for retouching lacquers the N-acylated compounds are the preferred light stabilisers of the invention.

What is claimed is:

1. A composition of matter consisting of an acid-catalysed stoving lacquer based on hot crosslinkable acrylic, polyester or alkyd resins and stabilised with a N-substituted 2,2,6,6-tetraalkylpiperidine compound or its acid addition salt.

2. A composition according to claim 1 which contains a compound which contains a group of the formula (I)

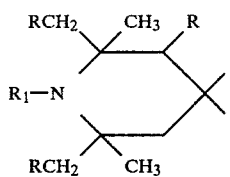

or which contains a polymer, the recurring structural units of which contain a group of the formula (I) or are linked through a bivalent group corresponding to the formula I, wherein $R_1$ represents a free valency, and otherwise R represents hydrogen or methyl and $R_1$ represents $C_1$–$C_{18}$ alkyl, $C_1$–$C_6$ hydroxyalkyl, $C_3$–$C_8$ alkenyl, $C_3$–$C_8$ alkynyl, $C_7$–$C_{12}$ aralkyl which is unsubstituted or substituted in the alkyl moiety by hydroxyl, or $C_1$–$C_8$ alkanoyl or $C_3$–$C_5$ alkenoyl.

3. A composition according to claim 1 which contains a compound or a polymer which contains a group of the formula (I) wherein R is hydrogen and $R_1$ represents $C_1$–$C_8$ alkanoyl or $C_3$–$C_5$ alkenoyl.

4. A composition according to claim 3, wherein $R_1$ is acetyl.

5. A composition according to claim 2 which contains a light stabiliser of the formula (II)

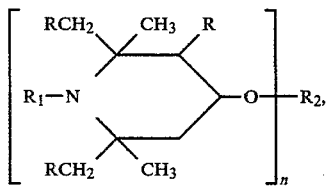

wherein n is 1 to 4, R is hydrogen or methyl, $R_1$ represents $C_1$–$C_{18}$ alkyl, $C_1$–$C_6$ hydroxyalkyl, $C_3$–$C_8$ alkenyl, $C_3$–$C_8$ alkynyl, $C_7$–$C_{12}$ aralkyl which is unsubstituted or substituted in the alkyl moiety by hydroxyl, or represents $C_1$–$C_8$ alkanoyl or $C_3$–$C_5$ alkenoyl, $R_2$ if n is 1, represents hydrogen, $C_1$–$C_{12}$ alkyl, cyanoethyl, glycidyl, benzyl, a monovalent radical of a saturated or unsaturated aliphatic, cycloaliphatic or aromatic carboxylic acid, carbamic acid or phosphorus-containing acid or a monovalent silyl radical, and if n is 2, represents $C_1$–$C_{12}$ alkylene, $C_4$–$C_{12}$ alkenylene, xylylene, a divalent radical of a saturated or unsaturated aliphatic, cycloaliphatic, araliphatic or aromatic dicarboxylic acid, dicarbamic acid or phosphorus-containing acid or a divalent silyl radical, and, if n is 3, represents a trivalent radical of an aliphatic, cycloaliphatic or aromatic tricarboxylic acid, of an aromatic tricarbamic acid or of a phosphorus-containing acid or a trivalent silyl radical, and, if n is 4, represents a quadrivalent radical of an aliphatic, cycloaliphatic or aromatic tetracarboxylic acid.

6. A composition according to claim 4 which contains a light stabiliser of the formula (II), wherein n is 1 or 2, R is hydrogen or methyl, $R_1$ is $C_1$–$C_{12}$ alkyl, allyl, benzyl, acetyl, acryloyl, and $R_2$ if n is 1, represents a radical of an aliphatic carboxylic acid of 2 to 18 carbon atoms, of a cycloaliphatic carboxylic acid of 5 to 12 carbon atoms or of an aromatic carboxylic acid of 7 to 15 carbon atoms, and if n is 2, represents a radical of an aliphatic dicarboxylic acid of 2 to 12 carbon atoms, of a cycloaliphatic or aromatic dicarboxylic acid of 8 to 14 carbon atoms, of an aliphatic, cycloaliphatic or aromatic dicarbamic acid of 8 to 14 carbon atoms.

7. A composition according to claim 2 which contains a light stabiliser of the formula (III)

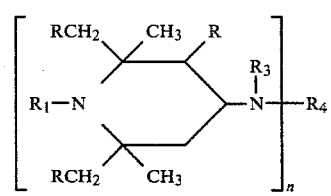

wherein n is 1 or 2, R is hydrogen or methyl, $R_1$ represents $C_1$–$C_{18}$ alkyl, $C_1$–$C_6$ hydroxyalkyl, $C_3$–$C_8$ alkenyl, $C_3$–$C_8$ alkynyl, $C_7$–$C_{12}$ aralkyl which is unsubstituted or substituted in the alkyl moiety by hydroxyl, or represents $C_1$–$C_8$ alkanoyl or $C_3$–$C_5$ alkenoyl, $R_3$ represents $C_1$–$C_{12}$ alkyl, $C_5$–$C_7$ cycloalkyl, $C_7$–$C_8$ aralkyl, $C_2$–$C_{18}$ alkanoyl, $C_3$–$C_5$ alkenoyl, or benzoyl, and $R_4$ if n is 1, represents $C_1$–$C_{12}$ alkyl, $C_5$–$C_7$ cycloalkyl, $C_2$–$C_8$ alkenyl which is unsubstituted or substituted by a cyano, carbonyl or carbamide group, glycidyl, a group of the formula —$CH_2CH(OH)$—Z or of the formula —CONH—Z, wherein Z is hydrogen, methyl or phenyl, and, if n is 2, represents $C_2$–$C_{12}$ alkylene, $C_6$–$C_{12}$ arylene, xylylene, a —$CH_2$—$CH(OH)$—$CH_2$— group or a —$CH_2$—$CH(OH)$—$CH_2$—O—X—O—$CH_2$—$CH(OH)$—$CH_2$— group, wherein X represents $C_2$–$C_{10}$ alkylene, $C_6$–$C_{15}$ arylene, $C_6$–$C_{12}$-cycloalkylene, or, with the proviso that $R_3$ does not represent alkanoyl, alkenoyl or benzoyl, $R_4$ can also represent a divalent radical of an aliphatic, cycloaliphatic or aromatic dicarboxylic acid or dicarbamic acid, or $R_3$ and $R_4$ together, if n is 1, can be the cyclic radical of an aliphatic or aromatic 1,2- or 1,3-dicarboxylic acid.

8. A composition according to claim 2 which contains a light stabiliser of the formula (IV)

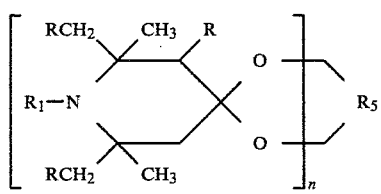

wherein n is 1 or 2, R is hydrogen or methyl, $R_1$ represents $C_1$–$C_{18}$ alkyl, $C_1$–$C_6$ hydroxyalkyl, $C_3$–$C_8$ alkenyl, $C_3$–$C_8$ alkynyl, $C_7$–$C_{12}$ aralkyl which is unsubstituted or substituted in the alkyl moiety by hydroxyl, or represents $C_1$–$C_8$ alkanoyl or $C_3$–$C_5$ alkenoyl, $R_5$ if n is 1, represents $C_2$–$C_8$ alkylene or hydroxyalkylene or C4–C22 acyloxyalkylene, and if n is 2, represents the group (—CH2)2C(CH2—)2.

9. A composition according to claim 2 which contains a light stabiliser of the formula (V)

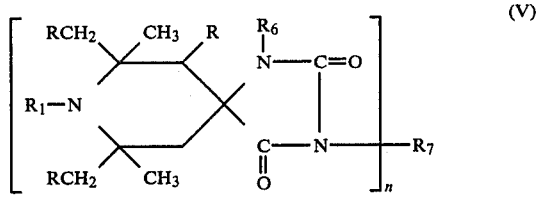
(V)

wherein n is 1 or 2, R is hydrogen or methyl, R1 represents C1–C18 alkyl, C1–C6 hydroxyalkyl, C3–C8 alkenyl, C3–C8 alkynyl, C7–C12 aralkyl which is unsubstituted or substituted in the alkyl moiety by hydroxyl, or represents C1–C8 alkanoyl or C3–C5 alkenoyl, R6 represents hydrogen, C1–C12 alkyl, allyl, benzyl, glycidyl, C2–C6 alkoxyalkyl, and R7 if n is 1, represents hydrogen, C1–C12 alkyl, glycidyl, C3–C5 alkenyl, C7–C9 aralkyl, C5–C7 cycloalkyl, C2–C4 hydroxyalkyl, C2–C6 alkoxyalkyl, C6–C10 aryl, and, if n is 2, represents C2–C12 alkylene, C6–C12 arylene or a group —CH2CH(OZ)CH2—(OCH2—CH(OZ)CH2)2—, wherein Z represents hydrogen, C1–C18 alkyl, allyl, benzyl, C2–C12 alkanoyl or benzoyl.

10. A composition according to claim 2 which contains a light stabiliser of the formula (VI)

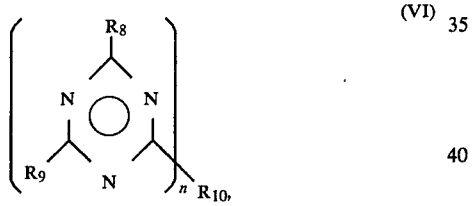
(VI)

wherein n is 1 or 2 and R8 represents a group of the formula

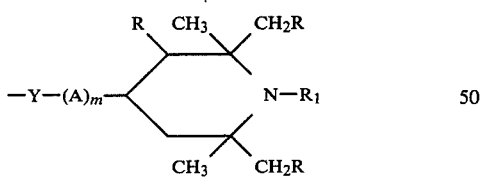

wherein R is hydrogen or methyl, R1 represents C1–C18 alkyl, C1–C6 hydroxyalkyl, C3–C8 alkenyl, C3–C8 alkynyl, C7–C12 aralkyl which is unsubstituted or substituted in the alkyl moiety by hydroxyl, or represents C1–C8 alkanoyl or C3–C5 alkenoyl, Y represents —O— or NR11, A represents C2–C6 alkylene, m is 0 or 1, R9 represents the groups R8, NR11R12, —OR12, —NHCH2OR13 or —N(CH2OR13)2, R10 if n is 1, represents the groups R8 or R9 and, if n is 2, represents the group —Y—Q—Y—, wherein Q represents C2–C6 alkylene which is optionally interrupted by —N(R14)—, R11 represents C1–C12 alkyl, cyclohexyl, benzyl or C1–C4 hydroxyalkyl or a group of the formula

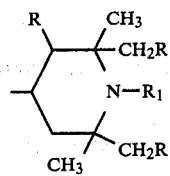

R12 represents C1–C12 alkyl, cyclohexyl, benzyl, C1–C4 hydroxyalkyl, R13 represents hydrogen, C1–C12 alkyl or phenyl, and R14 represents hydrogen or the group —CH2OR13, or R11 and R12 together are C4–C5 alkylene or oxaalkylene, or each of R11 and R12 also represents a group of the formula

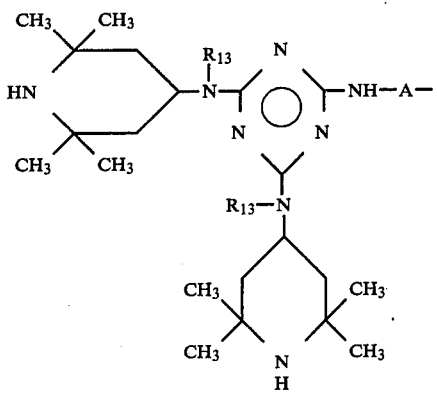

11. A composition according to claim 1 which contains a light stabiliser of the formula (VII)

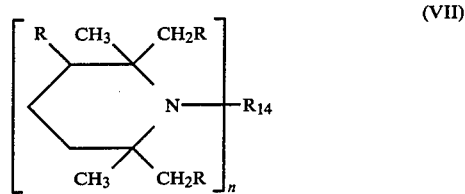
(VII)

wherein n is 1 or 2, R represents hydrogen or methyl, and R14 if n is 1, represents C4–C18 alkyl, C7–C12 aralkyl, the group —CO—R15, C1–C4 alkyl substituted by —CN, —COOR16, —OH, —OCOR17, or

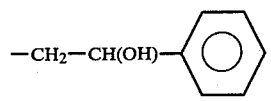

and R15 represents C1–C12 alkyl, C2–C4 alkenyl or phenyl, R16 represents C1–C18 alkyl, R17 represents C1–C18 alkyl, C2–C10 alkenyl, cyclohexyl, benzyl or C6–C10 aryl, or R14, if n is 2, represents C4–C12 alkylene, 2-butenylene-1,4, xylylene, the groups —(CH2)2—OOC—R18—COO—(CH2)2—, —CH2—OOC—R19—COO—CH2— or —CH2—CH(OH)—CH2—O—R18—O—CH2—CH(OH)—CH2—, wherein R18 represents C2–C10 alkylene, phenylene, cyclohexylene or 2,2-diphenylenepropane, and R19 represents C2–C10 alkylene, xylylene or cyclohexylene.

12. A composition according to claim 2 which contains a light stabiliser of the formula (VIII)

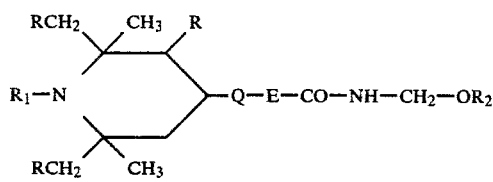

(VIII)

wherein Q is —N(R$_3$)— or —O—, E is C$_1$–C$_3$ alkylene, the —CH$_2$—CH(R$_4$)—O— group, wherein R$_4$ is hydrogen, methyl or phenyl, the —(CH$_2$)$_3$NH— group or a single bond, R is hydrogen or methyl, R$_1$ is C$_1$–C$_{18}$ alkyl, C$_3$–C$_8$ alkenyl, C$_3$–C$_8$ alkynyl, C$_7$–C$_{12}$ aralkyl, C$_1$–C$_8$ alkanoyl, C$_3$–C$_5$ alkenoyl or glycidyl, R$_2$ is hydrogen or C$_1$–C$_{18}$ alkyl, R$_3$ is hydrogen, C$_1$–C$_{18}$ alkyl, C$_5$–C$_7$ cycloalkyl, C$_7$–C$_{12}$ aralkyl, cyanoethyl, C$_6$–C$_{10}$ aryl, the —CH$_2$—CH(R$_4$)—OH group, wherein R$_4$ is as defined above, a group of the formula

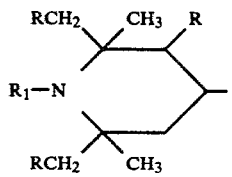

or a group of the formula

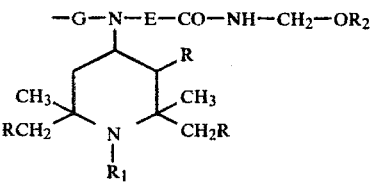

wherein G can be C$_2$–C$_6$ alkylene or C$_6$–C$_{12}$ arylene, or R$_3$ is a E—CO—NH—CH$_2$—OR$_2$ group.

13. A composition according to claim 2, which contains polymeric compounds as light stabilisers, the recurring structural units of which contain a group of the formula I or are linked through a bivalent group corresponding to the formula I, wherein R$_1$ represents a free valency, and otherwise R and R$_1$ have the meanings given in claim 2, in particular polyesters, polyethers, polyamides, polyamines, polyurethanes, polyureas, polyaminotriazines, poly(meth)acrylates, poly(meth)acrylamides and the copolymers thereof, which contain such radicals.

14. A composition according to claim 1, which contains an acid addition salt of a N-substituted 2,2,6,6-tetraalkylpiperidine compound.

15. A composition according to claim 1, wherein the N-substituted 2,2,6,6-tetraalkylpiperidine compound is contained in an amount of 0.1 to 5% by weight, based on the solvent-free binder (film-forming resin).

16. A composition according to claim 1, which contains additionally a UV absorber of the benzophenone, benzotriazole, acrylic acid derivative or oxalanilide type.

17. A composition according to claim 1, which additionally contains antioxidants, plasticisers, levelling agents, hardening catalysts, thickeners, dispersants or adhesion promoters.

18. A composition according to claim 1, which is a lacquer of high solids content for industrial finishes.

19. A composition according to claim 1 which is a retouching lacquer for automobiles.

* * * * *